(12) United States Patent
Wilson et al.

(10) Patent No.: US 9,054,749 B2
(45) Date of Patent: Jun. 9, 2015

(54) OPTIMIZING POWER CONSUMPTION IN A NEAR FIELD COMMUNICATIONS (NFC) ENVIRONMENT

(75) Inventors: Robin Wyndham John Wilson, Cirencester (GB); Philip Stewart Royston, Newbury (GB)

(73) Assignee: Broadcom Corporation, Irvine, CA (US)

( * ) Notice: Subject to any disclaimer, the term of this patent is extended or adjusted under 35 U.S.C. 154(b) by 780 days.

(21) Appl. No.: 13/172,392

(22) Filed: Jun. 29, 2011

(65) Prior Publication Data
US 2013/0005248 A1    Jan. 3, 2013

(51) Int. Cl.
*H04B 5/00* (2006.01)
*G06K 7/10* (2006.01)

(52) U.S. Cl.
CPC .......... *H04B 5/0056* (2013.01); *G06K 7/10217* (2013.01); *G06K 7/10237* (2013.01)

(58) Field of Classification Search
USPC ............. 455/41.1–41.2, 41.3, 574, 556.1, 62, 455/39, 555; 375/295, 259, 312, 344; 370/338, 331, 252, 310.1, 346, 347, 370/312, 329, 311, 475
See application file for complete search history.

(56) References Cited

U.S. PATENT DOCUMENTS

| | | | | |
|---|---|---|---|---|
| 8,483,311 | B2* | 7/2013 | Varteva | 375/295 |
| 2005/0099131 | A1* | 5/2005 | Amarillas et al. | 315/64 |
| 2006/0103535 | A1* | 5/2006 | Pahlaven et al. | 340/572.1 |
| 2006/0125605 | A1* | 6/2006 | Fischer et al. | 340/10.41 |
| 2007/0015465 | A1* | 1/2007 | Giroud et al. | 455/41.2 |
| 2009/0021213 | A1* | 1/2009 | Johnson | 320/109 |
| 2009/0146791 | A1* | 6/2009 | Jantunen et al. | 340/10.2 |
| 2009/0261778 | A1* | 10/2009 | Kook | 320/108 |
| 2009/0325488 | A1* | 12/2009 | Seol et al. | 455/41.2 |
| 2010/0245903 | A1* | 9/2010 | Sakakibara | 358/1.15 |
| 2011/0095723 | A1* | 4/2011 | Bhade et al. | 320/109 |
| 2011/0181399 | A1* | 7/2011 | Pollack et al. | 340/10.33 |

OTHER PUBLICATIONS

International Standard: ISO/IEC 21481, *Information technology—Telecommunications and information exchange between systems—Near Field Communication Interface and Protocol-2 (NFCIP-2)*, pp. 1-12, First edition, Reference number ISO/IEC 21481:2005(E), ISO/IEC (Jan. 2005).

(Continued)

*Primary Examiner* — Ganiyu A Hanidu
(74) *Attorney, Agent, or Firm* — Sterne, Kessler, Goldstein & Fox P.L.L.C.

(57) ABSTRACT

An apparatus and method is disclosed to optimize power consumption in a NFC environment. A first NFC capable device provides a polling command to a second NFC capable device. The second NFC capable device provides a response to the polling command. The first NFC capable device provides a read command to the second NFC capable device. The second NFC capable device provides a response to the read command that indicates an overvoltage condition is present. The first NFC capable device adjusts a power level that is to be used to transmit further commands when the overvoltage condition is present.

20 Claims, 7 Drawing Sheets

(56) References Cited

OTHER PUBLICATIONS

International Standard: ISO/IEC 18092, *Information technology—Telecommunications and information exchange between systems—Near Field Communications—Interface and Protocol (NFCIP-1 )*, pp.1-66, First edition, Reference number ISO/IEC 18092:2004(E), ISO/IEC (Apr. 2004).

ISO/IEC JTC1/SC17 N 3613, *Notification of Ballot: ISO/IEC FCD 14443-3 (Revision)—Identification Cards—Contactless integrated circuit(s ) cards—Proximity cards—Part 3: Initialization and anti-collistion*, pp. 1-66, Second edition, ISO/IEC (Nov. 2008).

\* cited by examiner

OPTIMIZING POWER CONSUMPTION IN A NEAR FIELD COMMUNICATIONS (NFC) ENVIRONMENT

BACKGROUND

1. Field of Invention

The invention relates to near field communications (NFC), and more specifically to optimizing power consumption in a NFC environment.

2. Related Art

Near field communication (NFC) devices are being integrated into mobile devices, such as smartphones for example, to facilitate the use of these mobile devices in conducting daily transactions. For example, instead of carrying numerous credit cards, the credit information provided by these credit cards can be loaded into a NFC device and stored therein to be used as needed. The NFC device is simply tapped to a credit card terminal to relay the credit information to it to complete a transaction. As another example, a ticket writing system, such as those used in bus and train terminals, may simply write ticket fare information onto the NFC device instead of providing a paper ticket to a passenger. The passenger simply taps the NFC device to a reader to ride the bus or the train without the use of the paper ticket.

Conventionally, a first NFC and a second NFC device operate in a conventional polling mode of operation to establish communication. The first NFC device provides a conventional polling command to the second NFC device. The second NFC device provides a conventional response to the conventional polling command. The first NFC device provides a conventional read command to the second NFC to recover a conventional unique identifier (UID) of the second NFC device. The second NFC device provides a conventional response to the read command.

Typically, the conventional response to the read command often includes only a portion of the UID of the second NFC device. The first NFC device often provides several read commands to the second NFC device to recover a complete UID of the second NFC device. However, the first NFC device may provide these read commands with too much power which may require regulation by the second NFC device, thereby wasting power in the NFC environment.

Thus, there is a need to optimize power consumption in a NFC environment that overcomes the shortcomings described above. Further aspects and advantages of the present invention will become apparent from the detailed description that follows.

BRIEF DESCRIPTION OF THE DRAWINGS/FIGURES

Embodiments of the invention are described with reference to the accompanying drawings. In the drawings, like reference numbers indicate identical or functionally similar elements. Additionally, the left most digit(s) of a reference number identifies the drawing in which the reference number first appears.

Figure 1:
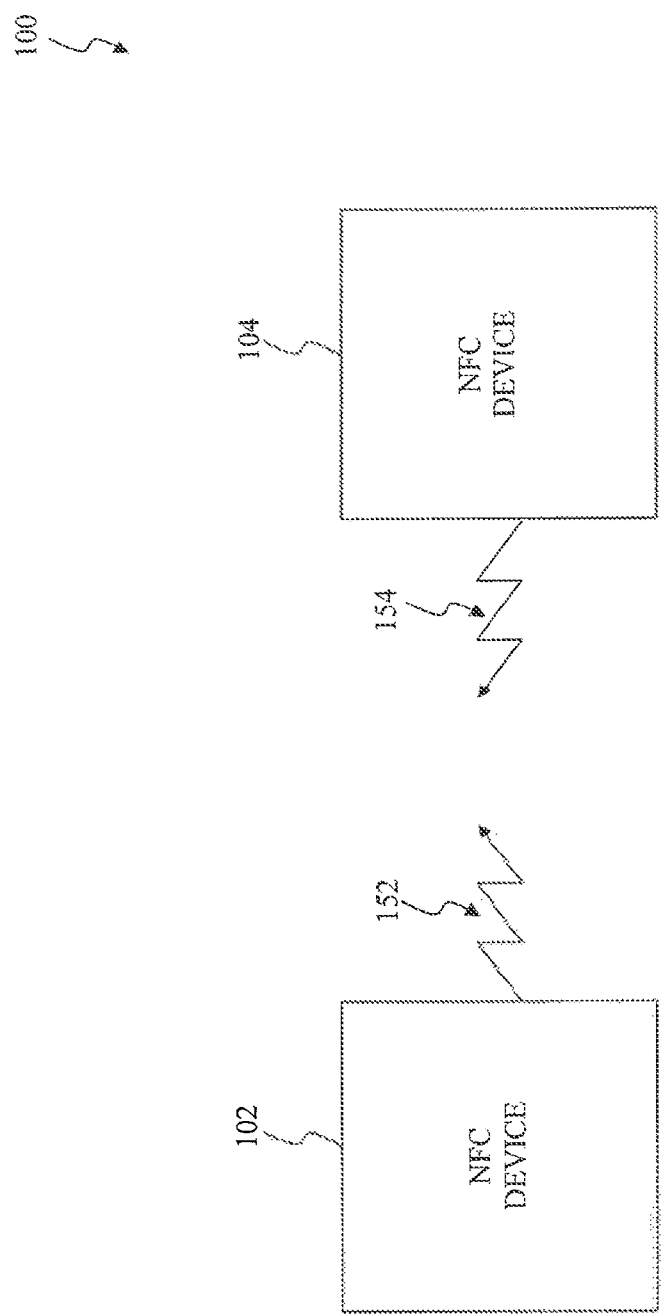
FIG. 1 illustrates a block diagram of a NFC environment according to an exemplary embodiment of the invention.

The invention will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE INVENTION

The following Detailed Description refers to accompanying drawings to illustrate exemplary embodiments consistent with the invention. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the invention. Therefore, the Detailed Description is not meant to limit the invention. Rather, the scope of the invention is defined only in accordance with the following claims and their equivalents.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the invention. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Although, the description of the present invention is to be described in terms of NFC, those skilled in the relevant art(s) will recognize that the present invention may be applicable to other communications that use the near field and/or the far field without departing from the spirit and scope of the present invention. For example, although the present invention is to be described using NFC capable communication devices, those skilled in the relevant art(s) will recognize that functions of these NFC capable communication devices may be applicable to other communications devices that use the near field and/or the far field without departing from the spirit and scope of the present invention.

An Exemplary Near Field Communications (NFC) Environment

FIG. 1 illustrates a block diagram of a NFC environment according to an exemplary embodiment of the invention. A NFC environment 100 provides wireless communication of information, such as one or more commands and/or data, among a first NFC device 102 and a second NFC device 104 that are sufficiently proximate to each other. The first NFC device 102 and/or the second NFC device 104 may be implemented as a standalone or a discrete device or may be incorporated within or coupled to another electrical device or host device such as a mobile telephone, a portable computing device, another computing device such as a personal, a laptop, or a desktop computer, a computer peripheral such as a printer, a portable audio and/or video player, a payment system, a ticketing writing system such as a parking ticketing system, a bus ticketing system, a train ticketing system or an entrance ticketing system to provide some examples, or in a ticket reading system, a toy, a game, a poster, packaging, advertising material, a product inventory checking system and/or any other suitable electronic device that will be apparent to those skilled in the relevant art(s) without departing from the spirit and scope of the invention.

The first NFC device 102 establishes communication with the second NFC device 104 through a polling operation.

Conventional Polling Mode of Operation

Figure 2:
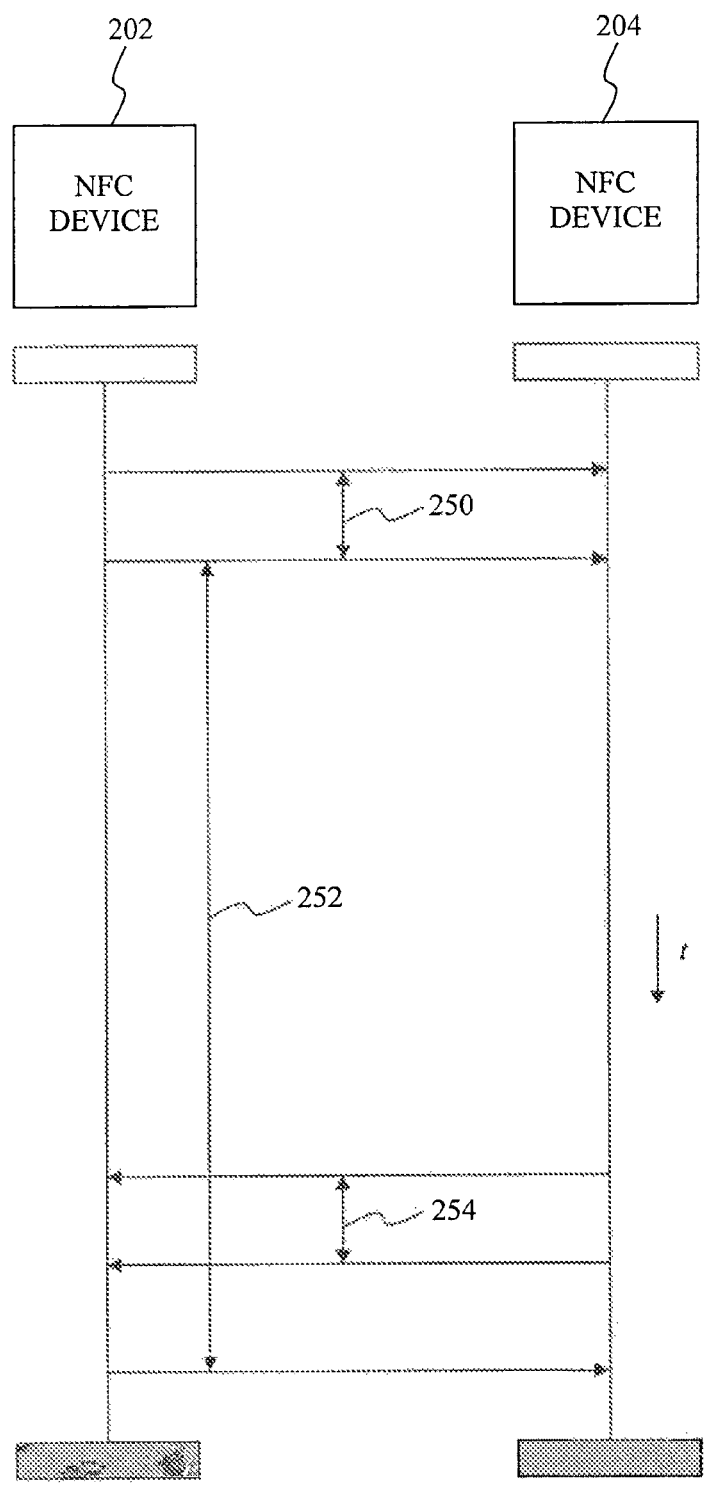
FIG. 2 illustrates a conventional polling mode of operation used by a first conventional NFC device and a second conventional NFC device to establish communication.

Conventionally, a first conventional NFC device establishes communication with a second conventional NFC device through a conventional polling operation. FIG. 2 illustrates a conventional polling mode of operation used by a first conventional NFC device and a second conventional NFC device to establish communication. A first conventional NFC device 202 is configured to operate in an initiator, or reader, mode of operation and a second conventional NFC device 204 is configured to operate in a target, or tag, mode of operation. The first conventional NFC device 202 initiates a communication with the second conventional NFC device 204 in the reader mode of operation. The second conventional NFC device 204 responds to a request to initiate the communication from the first conventional device 202 in the tag mode of operation.

The first conventional device 202 and a second conventional NFC device 204 operate in a conventional polling mode of operation to perform a conventional polling procedure to establish the communication. The first conventional NFC device 202 modulates a conventional polling command onto its corresponding carrier wave and generates a magnetic field by applying the modulated carrier wave to its first antenna to provide a modulated data communication 250. Afterwards, the first conventional NFC device 202 continues to apply its carrier wave without the conventional polling command to the first antenna to generate the magnetic field to provide an unmodulated data communication 252. The conventional polling command may include a conventional request command, Type A (REQA) to probe the magnetic field for Type A NFC capable devices, a conventional request command, Type B (REQB) to probe the magnetic field for Type B NFC capable devices.

The second conventional NFC device 204 derives or harvests power from the modulated data communication 250 and/or the unmodulated data communication 252 to recover, to process, and to provide a response to the conventional polling command. The second conventional NFC device 204 modulates the magnetic field that is inductively coupled onto its second antenna with the response to the conventional polling command to provide a second modulated data communication 254. The response to the conventional polling command may include a conventional answer to request, Type A (ATQA) in response to a REQA or a conventional answer to request, Type B (ATQB) in response to a REQB.

The first conventional device 202 modulates a conventional read command onto its corresponding carrier wave and generates the magnetic field by applying the modulated carrier wave to its first antenna to provide a modulated data communication 256. Afterwards, the first conventional NFC device 202 continues to apply its carrier wave without the conventional read command to the first antenna to generate the magnetic field to provide an unmodulated data communication 258. The conventional read command may include one or more commands to form conventional anti-collision (ANTICOLLISION) commands.

The second conventional NFC device 204 derives or harvests power from the modulated data communication 256 and/or the unmodulated data communication 258 to recover, to process, and to provide a conventional response to the conventional read command. The second conventional NFC device 204 modulates the magnetic field that is inductively coupled onto its second antenna with the response to the conventional read command to provide a second modulated data communication 260. The response to the conventional read command may include a conventional select acknowledge (SAK) command. Conventionally, the conventional response to the conventional read command includes a conventional unique identifier (UID), or a portion thereof, that corresponds to the second conventional NFC device 204. Typically, the conventional UID is used to identify a technology, such as Type A, Type B, or Type F to provide some examples, of the second NFC device 304 and a version of the technology being used.

The conventional REQA, the conventional REQB, the conventional ATQA, the conventional ATQB, the conventional ANTICOLLISION command, the conventional UID, and the conventional SAK are further described in International Standard: ISO/IEC FCD 14443-3, "Identification Cards—Contactless integrated circuit(s) cards—Proximity cards—Part 3:

Initialization and anti-collision," Reference Number ISO/IEC FCD 14443-3 (Revision), Nov. 24, 2008, which is incorporated by reference herein in its entirety.

Typically, the first conventional device 202 continues to provide the conventional ANTICOLLISION And the second conventional NFC device 204 provides the conventional SAK in response to the conventional ANTICOLLISION command until the conventional UID, in its entirety, is provided to the first conventional device 202.

According to ISO/IEC FCD 14443-3, the conventional SAK includes eight encoded bits B1 through B8 as shown below in TABLE 1:

TABLE 1

| B8 | B7 | B6 | B5 | B4 | B3 | B2 | B1 |
|----|----|----|----|----|----|----|----|
| X  | X  | X  | X  | X  | 1  | X  | X  |
| X  | X  | 1  | X  | X  | 0  | X  | X  |
| X  | X  | 0  | X  | X  | 0  | X  | X  |

As shown in TABLE 1, the conventional SAK may indicate one of three possible responses to the conventional ANTICOLLISION command. A first possible response, indicated by setting bit B3 to a logical 1, indicates that the conventional UID of the second conventional NFC device 204 has not been entirely provided to the first conventional device 202. The "X" in TABLE 1 indicate bits that ignored by the first conventional device 202. In this situation, the first conventional device 202 provides another ANTICOLLISION command to receive additional bits of the conventional UID of the second conventional NFC device 204. The conventional UID consists of 4, 7, or 10 bytes, conventionally referred to a single, double, or triple UID size. The first conventional device 202 may have to provide additional ANTICOLLISION commands to receive UIDs of the double or the triple size.

A second possible response, indicated by setting bit B6 to a logical 1 and bit B3 to a logical 0, indicates the conventional UID of the second conventional NFC device 204 has been entirely provided to the first conventional device 202 and the second conventional NFC device 204 is complaint with ISO/IEC FCD 14443-4. A third possible response, indicated by setting bit B6 to a logical 1 and bit B3 to a logical 1, indicates the conventional UID of the second conventional NFC device 204 has been entirely provided to the first conventional device 202 and the second conventional NFC device 204 is not complaint with ISO/IEC FCD 14443-4.

Polling Mode of Operation According to an Exemplary Embodiment of the Present Invention The present invention modifies the conventional SAK to optimize power consumption between a first NFC capable device and a second NFC capable device. For example, the present invention encodes combination of the bits B1 through B8 of the conventional SAK, which are conventionally ignored, to optimize power consumption between the first NFC capable device and the second NFC capable device.

Figure 3:
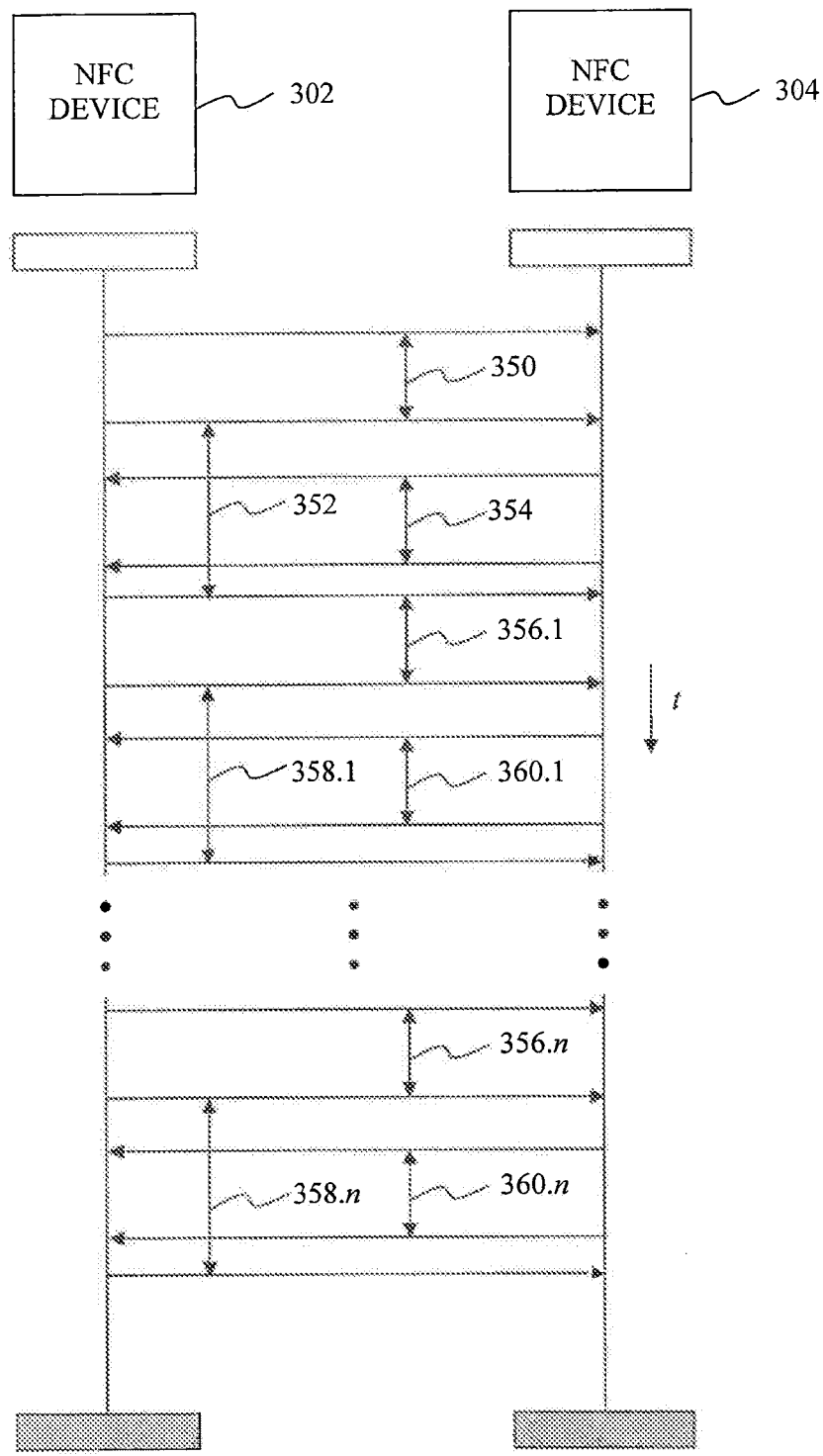
FIG. 3 illustrates a polling mode of operation used by a first NFC device and a second NFC device to establish communication according to an exemplary embodiment of the present invention.

FIG. 3 illustrates a polling mode of operation used by a first NFC device and a second NFC device to establish communication according to an exemplary embodiment of the present invention. A first NFC device 302 is configured to operate in an initiator, or reader, mode of operation and a first NFC device 302 is configured to operate in a target, or tag, mode of operation.

The first NFC device 302 and a second NFC device 304 operate in a polling mode of operation to perform a polling procedure to establish a communication. The first NFC device 302 modulates a polling command onto its corresponding carrier wave and generates a magnetic field by applying the modulated carrier wave to its first antenna to provide a modulated data communication 350. Afterwards, the first NFC device 302 continues to apply its carrier wave without the polling command to the first antenna to generate the magnetic field to provide an unmodulated data communication 352. The polling command may include the conventional REQA to probe the magnetic field for Type A NFC capable devices, the conventional REQB to probe the magnetic field for Type B NFC capable devices, or any other suitable polling command to probe the magnetic field for other types of NFC capable devices, such as Type F NFC capable devices to provide an example, that will be apparent to those skilled in the relevant art(s) without departing from the spirit and scope of the present invention.

The second NFC device 304 derives or harvests power from the modulated data communication 350 and/or the unmodulated data communication 352 to recover, to process, and to provide a response to the polling command. The second NFC device 304 modulates the magnetic field that is inductively coupled onto its second antenna with the response to the polling command to provide a second modulated data communication 354. The response to the polling command may include the conventional ATQA, the conventional ATQB, or any other suitable response to the polling command that will be apparent to those skilled in the relevant art(s) without departing from the spirit and scope of the present invention.

The first NFC device 302 modulates read commands onto its corresponding carrier wave and generates the magnetic field by applying the modulated carrier wave to its first antenna to provide modulated data communications 356.1 through 356.n. After each of the provide modulated data communications 356.1 through 356.n, the first NFC device 302 continues to apply its carrier wave without the conventional read command to the first antenna to generate the magnetic field to provide a corresponding unmodulated data communications 358.1 through 358.n. The conventional read commands may include the conventional ANTICOLLISION command or any other suitable read command that will be apparent to those skilled in the relevant art(s) without departing from the spirit and scope of the present invention.

The second NFC device 304 derives or harvests power from the modulated data communications 356.1 through 356.n and/or the unmodulated data communications 358.1 through 358.n to recover, to process, and to provide responses to the read commands. The second NFC device 304 monitors the power for an overvoltage condition. The second NFC device 304 compares the power with an overvoltage threshold to determine the presence of the overvoltage condition. Typically, the overvoltage condition is present when the power is greater than the over voltage threshold. The overvoltage condition indicates that power levels of the modulated data communications 356.1 through 356.n and/or the unmodulated data communications 358.1 through 358.n are too large and require reduction by regulation to provide an example. Typically, the second NFC device 304 may regulate power levels of received communications signals, such as the modulated data communications 356.1 through 356.n and/or the unmodulated data communications 358.1 through 358.n, to ensure that these received communications signals do not cause damage to the second NFC device 304. This regulation by the second. NFC device 304 wastes power in the NFC environment. Additionally, this regulation may cause an unnecessarily increase in a temperature of the second NFC device 304. The second NFC device 304 indicates to the first NFC device 302 that it may reduce the power levels of the modulated data communications 356.1 through 356.*n* and/or the unmodulated data communications 358.1 through 358.*n* to optimize power consumption.

The second NFC device 304 may indicate to the first NFC device 302 that the overvoltage condition is present by encoding one or more combinations of the bits B1 through B8 of the conventional SAK to provide a modified SAK. For example, the second NFC device 304 may encode a single bit, such as bit B8 to provide an example, of the conventional SAK to be a logical 1 to indicate the presence of the overvoltage condition or a logical 0 to indicate the absence of the overvoltage condition. As another example, the second NFC device 304 may encode combinations of bits, such as bit B8 and B7 to provide an example, of the conventional SAK to be a first logical value to indicate the presence of the overvoltage condition or a second value to indicate the absence of the overvoltage condition. However, these examples are not limiting, those skilled in the relevant art(s) will recognize that other bits or combinations of bits are possible without departing from the spirit of the invention. The second NFC device 304 appends the modified SAK to the conventional UID, or a portion thereof, to provide a response to the corresponding read command.

Alternatively, the second NFC device 304 may indicate to the first NFC device 302 that the overvoltage condition is present by encoding one or more combinations of the conventional UID, or a portion thereof, to provide a modified UID. For example, the second NFC device 304 may encode one or more bits of the conventional UID, such as the most significant bit to provide an example, that are unused, reserved for future use, or are typically ignored by the first NFC device 302. The second NFC device 304 appends the conventional SAK to the modified UID to provide the response to the corresponding read command.

In another alternate, the second NFC device may indicate to the first NFC device 302 that the overvoltage condition is present by providing the response to the corresponding read command that includes the modified SAK and the modified UID.

The second NFC device 304 modulates the magnetic field that is inductively coupled onto its second antenna with the response to a corresponding read command to provide a corresponding second modulated data communication 360.1 through 360.*n*. The responses to the read commands may include the modified SAK and the conventional UID unique identifier (UID), or a portion thereof, that corresponds to the second NFC device 304.

The first NFC device 302 processes each of the second modulated data communications 360.1 through 360.*n* to determine whether more modulated data communications 356.1 through 356.*n* are required to recover a complete UID of the second NFC device 302. As discussed above, the conventional UID may be of the single, the double, or the triple size. The first NFC device 302 provides the modulated data communication 356.1 and the second NFC device 304 responds with the second modulated data communications 360.1 to recover the single size conventional UID. Similarly, the first NFC device 302 provides the modulated data communication 356.1 and 356.2 and the second NFC device 304 responds with the second modulated data communications 360.1 and 360.2 to recover the double size conventional UID. Likewise, the first NFC device 302 provides the modulated data communication 356.1 through 356.3 and the second NFC device 304 responds with the second modulated data communications 360.1 through 360.3 to recover the triple size conventional UID. However these examples are not limiting, those skilled in the relevant art(s) will recognize that the first NFC device 302 may provide any suitable number of the modulated data communications 356.1 through 356.*n* and the second NFC device 304 may provide any suitable number of the second modulated data communications 360.1 through 360.*n* without departing from the spirit and scope of the present invention.

Additionally, the first NFC device 302 processes each of the second modulated data communications 360.1 through 360.*n* to recover the modified SAK to determine whether the overvoltage condition is present in the second NFC device 304. The first NFC device 302 decodes one or more bits, or combinations of the bits, B1 through B8 of the modified SAK. For example, the first NFC device 302 may decode a single bit, such as bit B8 to provide an example, of the modified SAK to indicate the presence or absence of the overvoltage condition. As another example, the first NFC device 302 may decode combinations of bits, such as bit B8 and B7 to provide an example, of the modified SAK to indicate the presence or absence of the overvoltage condition. However, these examples are not limiting, those skilled in the relevant art(s) will recognize that the first NFC device 302 may decode other bits, or combinations of bits, of the modified SAK or any other command without departing from the spirit of the invention.

The first NFC device 302 may adjust a power level of the modulated data communications 356.1 through 356.*n* and/or the unmodulated data communications 358.1 through 358.*n* in response to the overvoltage condition. The first NFC device 302 may adjust a power level of one or more of the read commands, adjust a power level of its corresponding carrier wave, and/or adjust a tuning of the first antenna to adjust the power level of the modulated data communications 356.1 through 356.*n* and/or the unmodulated data communications 358.1 through 358.*n* in response to the overvoltage condition. However this example is not limiting, those skilled in the relevant art(s) will recognize that the first NFC device 302 may determine a power level of any future communication to the second NFC device 304 in response to the overvoltage condition being present in any response from the second NFC device 302 without departing from the spirit and scope of the present invention.

The first NFC device 302 may adjust the power level of the modulated data communications 356.1 through 356.*n* and/or the unmodulated data communications 358.1 through 358.*n* by a power level adjustment in response to the overvoltage condition. For example, the first NFC device 302 may adjust the power level of the modulated data communications 356.1 through 356.*n* and/or the unmodulated data communications 358.1 through 358.*n* by a power level adjustment in the presence of the overvoltage condition. The power level adjustment may relate to one or more settings of the first NFC device 302, such as the power level of one or more of the read commands, the power level of its corresponding carrier wave, and/or the tuning of the first antenna to provide some examples. As another example, the power level adjustment may be determined through a binary search algorithm such as an iterative and/or a recursive search, and/or an interpolation search of possible power levels of the modulated data communications 356.1 through 356.*n* and/or the unmodulated data communications 358.1 through 358.*n*. As a further example, the power level adjustment may be determined using a look-up table of the possible power levels of the modulated data communications 356.1 through 356.*n* and/or the unmodulated data communications 358.1 through 358.*n*.

In some circumstances, the power level adjustment may adjust the power level of the modulated data communications 356.1 through 356.*n* and/or the unmodulated data communications 358.1 through 358.n too much such that the second NFC device 304 may be unable to harvest sufficient power from the modulated data communications 356.1 through 356.n and/or the unmodulated data communications 358.1 through 358.n to recover, to process, and to provide its responses to the read commands. The first NFC device 302 resets and activates a timing mechanism after providing each of the modulated data communications 356.1 through 356.n which deactivates upon receiving a corresponding second modulated data communication 360.1 through 360.n. Upon expiration of the timing mechanism, the first NFC device 302 assumes the power level of the modulated data communications 356.1 through 356.n and/or the unmodulated data communications 358.1 through 358.n is insufficient for the second NFC device 304 to harvest sufficient power from the modulated data communications 356.1 through 356.n and/or the unmodulated data communications 358.1 through 358.n to recover, to process, and to provide its responses to the read commands. In this situation, the first NFC device 302 adjusts the power level, typically by increasing, of the modulated data communications 356.1 through 356.n and/or the unmodulated data communications 358.1 through 358.n and provides another modulated data communications 356.1 through 356.n to the second NFC device 104 at this increased power level.

Referring again to FIG. 1, upon establish communication with the second NFC capable device, the first NFC device 102 modulates its corresponding information onto the first carrier wave and generates the first magnetic field by applying the modulated information communication to the first antenna to provide the first information communication 152. The first NFC device 102 continues to apply the first carrier wave without its corresponding information to continue to provide the first information communication 152 once the information has been transferred to the second NFC device 104. The first NFC device 102 is sufficiently proximate to the second NFC device 104 such that the first information communication 152 is inductively coupled onto a second antenna of the second NFC device 104.

The second NFC device 104 derives or harvests power from the first information communication 152 to recover, to process, and/or to provide a response to the information. The second NFC device 104 demodulates the first information communication 152 to recover and/or to process the information. The second NFC device 104 may respond to the information by applying its corresponding information to the first carrier wave that is inductively coupled onto the second antenna to provide the second modulated information communication 154.

Further operations of the first NFC device 102 and/or the second NFC device 104 may be described in International Standard ISO/IE 18092:2004(E), "Information Technology—Telecommunications and Information Exchange Between Systems—Near Field Communication—Interface and Protocol (NFCIP-1)," published on Apr. 1, 2004 and International Standard ISO/IE 21481:2005(E), "Information Technology—Telecommunications and Information Exchange Between Systems—Near Field Communication—Interface and Protocol-2 (NFCIP-2)," published on Jan. 15, 2005, each of which is incorporated by reference herein in its entirety.

Although FIG. 1 and FIG. 3 have been described in terms of an initiator mode operation and a target mode of operation, those skilled in the relevant art(s) will recognize that the first NFC device 102 and/or the second NFC device 104 as described in FIG. 1 and/or the first NFC device 302 and/or the second NFC device 304 as described in FIG. 3 may alternatively be configured to operate in a communicator mode of operation without departing from the spirit and scope of the present invention. These NEC devices are configurable to operate in the initiator mode operation and/or the target mode of operation and may switch between these modes of operation in the communicator mode of operation.

Figure 4:
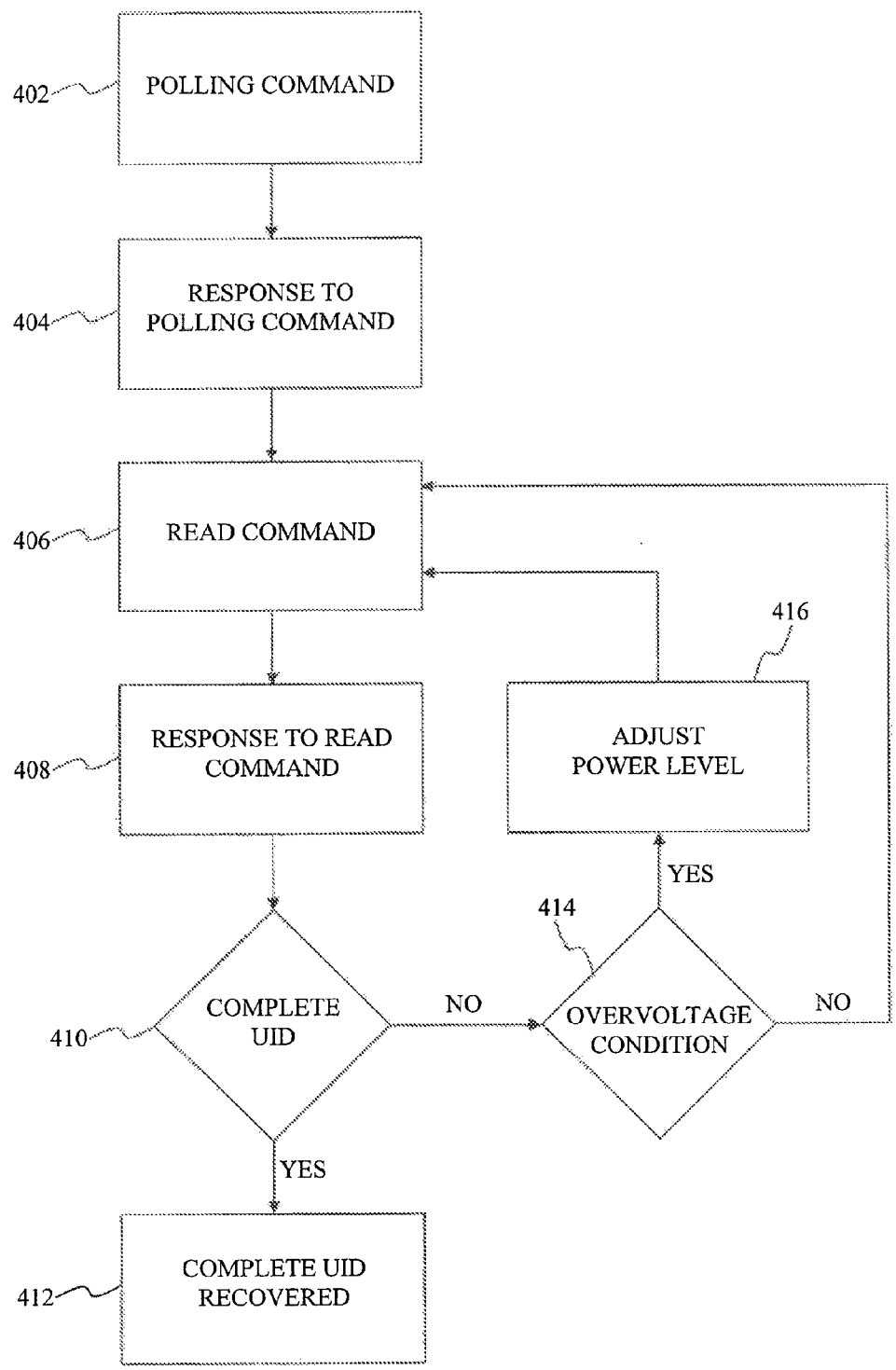
FIG. 4 is a flowchart of exemplary operational steps for detecting optimizing power consumption in a near field communications environment according to an exemplary embodiment of the present invention.

Method for Optimizing Power Consumption in a Near Field Communications (NFC) Environment FIG. 4 is a flowchart of exemplary operational steps for detecting optimizing power consumption in a near field communications environment according to an exemplary embodiment of the present invention. The invention is not limited to this operational description. Rather, it will be apparent to persons skilled in the relevant art(s) from the teachings herein that other operational control flows are within the scope and spirit of the present invention. The following discussion describes the steps in FIG. 4.

At step 402, a first NFC capable device, such as the first NFC device 102 or the first NFC device 302 to provide some examples, provides a polling command to a second NFC capable device, such as the second NFC device 104 or the second NFC device 304 to provide some examples. The polling command may include the conventional REQA, the conventional REQB, or any other suitable polling command that will be apparent to those skilled in the relevant art(s) without departing from the spirit and scope of the present invention.

At step 404, the second NFC capable device provides a response to the polling command from step 402. The response to the polling command may include the conventional ATQA, the ATQB, or any other suitable response to the request that will be apparent to those skilled in the relevant art(s) without departing from the spirit and scope of the present invention.

At step 406, the first NFC capable device provides a read command to the second NFC capable device. The read command may represent a command to read the conventional UID from the second capable NFC device. The read command may include the conventional ANTICOLLISION command or any other suitable read command that will be apparent to those skilled in the relevant art(s) without departing from the spirit and scope of the present invention.

At step 408, the second NFC capable device provides a response to the read command from step 406. The response to the read command includes the conventional UID, or a portion thereof, and an indication whether the overvoltage condition, as described above, is present. The response to the read command may include the modified SAK and/or the modified UID.

At step 410, the first NFC capable device determines a complete conventional UID of the second NFC device has been received. The operational control flow proceeds to step 412 when the complete conventional UID has been received. Otherwise, the operational control flow proceeds to step 412 when the complete conventional UID has not been received to recover more bits of the conventional UID.

At step 412, the first NFC capable device has recovered the complete conventional UID of the second NFC device.

At step 414, the first NFC capable device determines whether the overvoltage condition is present in the second NFC capable device from the response from step 408. The operational control flow proceeds to step 415 when overvoltage condition is present in the second NFC capable device. Otherwise, the operational control flow reverts to step 406 to provide another read command to recover more of the conventional UID.

At step 416, the first NFC capable device adjusts a power level that was used to transmit the read command from step 406. The operational control flow reverts to step 406 to provide another read command at the power level from step 416 to recover more of the conventional UID.

An Exemplary NFC Device

Figure 5:
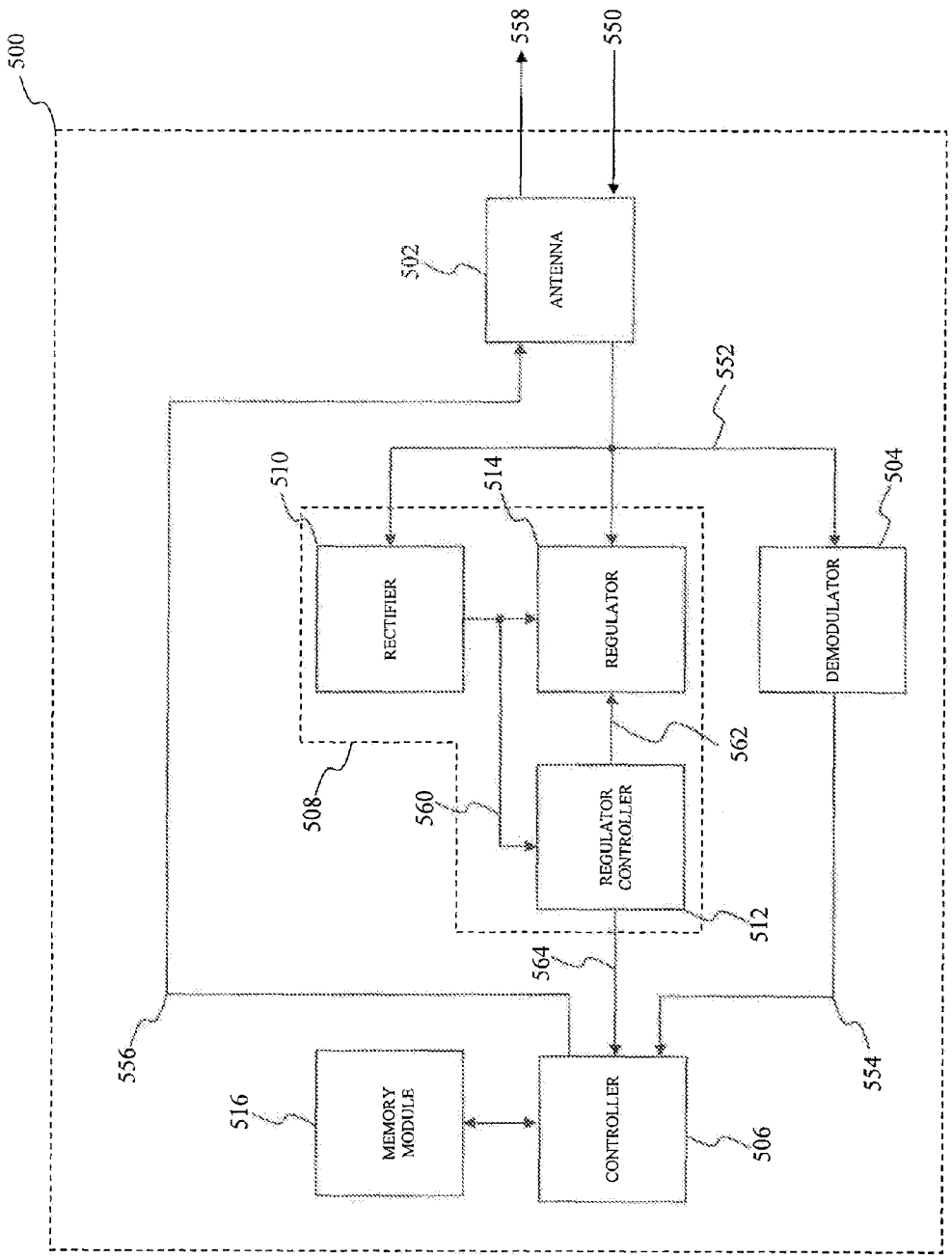
FIG. 5 illustrates a block diagram of a NFC device that may be used to detect a presence of an overvoltage condition according to an exemplary embodiment of the invention.

FIG. 5 illustrates a block diagram of a NFC device that may be used to detect a presence of an overvoltage condition according to an exemplary embodiment of the invention. A NFC device 500 is configurable to operate in the target, or tag, mode of operation to respond to a request to initiate a communication from another NFC capable device, such as the first NFC device 102 or the first NFC device 104 to provide some examples, in a polling mode of operation. The NFC device 500 monitors transmissions from the other NFC capable device to optimizing power consumption during the polling mode of operation. The NFC device 500 includes an antenna module 502, a demodulator module 504, a controller module 506, a power harvesting module 508, and a memory module 516. The NFC device 500 may represent an exemplary embodiment of the first NFC device 102 and/or the first NFC device 302.

The antenna module 502 inductively receives a received communications signal 550 from the other NEC capable device to provide a recovered communications signal 552. Typically, the received communications signal 550 includes the polling command and/or the read command, each of which has been modulated the other NFC capable device.

The demodulator module 504 demodulates the recovered communications signal 552 using any suitable analog or digital modulation technique to provide a recovered command 554. The recovered command 554 may the polling command and/or the read command. The suitable analog or digital modulation technique may include amplitude modulation (AM), frequency modulation (FM), phase modulation (PM), phase shift keying (PSK), frequency shift keying (FSK), amplitude shift keying (ASK), quadrature amplitude modulation (QAM) and/or any other suitable modulation technique that will be apparent to those skilled in the relevant art(s).

The controller module 506 controls overall operation and/or configuration of the NFC device 500. The controller module 506 provides a response 556 to the recovered command 554. The response 556 may include the response to the polling command, such as the conventional ATQA, the conventional ATQB, or any other suitable response to the polling command to provide some examples, and/or the response to the read command, such as the modified SAK to provide an example.

Typically, the other NFC capable device inductively couples a carrier wave on the antenna module 502 as the received communications signal 550 after it has transferred the polling command and/or the read command to the NFC device 500. The controller module 506 modulates this carrier wave with the response 556 to provide a transmitted communications signal 558. For example, an impedance of the antenna module 502 varies based upon the response 556 to vary a load of the other NFC capable device.

The power harvesting module 508 may harvest power for the NFC device 500 from the recovered communications signal 552. The power couplings from the power harvesting module 508 that supply the power to other modules of the NFC device 500, such as the antenna module 502, the demodulator module 504, and/or the controller module 506, are not shown in FIG. 5. The power harvesting module 508 includes a rectifier module 510, a regulator controller 512, and a regulator module 514.

The rectifier module 510 rectifies the recovered communication signal 552 to provide a rectified power 560. The rectifier module 510 substantially converts the recovered communication signal 552 from alternating current (AC) to direct current (DC) to provide the rectified power 560. The rectifier module 510 may be implemented using any suitable means to perform half-wave rectification or full-wave rectification that will be apparent to those skilled in the relevant art(s) without departing from the spirit and scope of the present invention.

The regulator controller 512 compares the rectified power 560 with a reference power, such as a current and/or voltage, to provide a regulation control signal 562. For example, the other NFC capable device may inductively couple the received communications signal 550 onto the antenna module 502 to provide the recovered communication signal 552. As the other NFC capable device moves closer to the NFC device 500, a power level of the recovered communication signal 552 increases. The regulator controller 512 provides the regulation control signal 562 to cause the regulator module 514 to adjust the power level of the recovered communication signal 552 to protect the NFC device 500 when the rectified power 560 exceeds the reference power. The regulator additionally compares the regulation control signal 562 with an overvoltage threshold to provide an overvoltage indicator 564. The overvoltage threshold may set to a value that is greater than or equal to the reference power. The overvoltage indicator 564 may represent a first logical level to indicate that the overvoltage condition is not present or a second logical level to indicate that the overvoltage condition is present.

The regulator module 514 adjusts a power level of the recovered communication signal 552 in response to the regulation control signal 562. The regulator module 514 may be implemented using any suitable linear regulator, such as a series regulator or a shunt regulator to provide some examples, any suitable non-linear regulator such as a switching regulator to provide an example, or any combination thereof.

The controller module 506 formats the response 556 to the recovered command 554 in accordance with the overvoltage indicator 564. For example, the controller module 506 may retrieve the conventional UID, or a portion thereof, from the memory module 516. The controller module 506 may encode the one or more combinations of the bits B1 through B8 of the conventional SAK according to the overvoltage indicator 564 to provide the modified SAK. The controller module 506 may append the modified SAK to the conventional UID to form the response 556. Alternatively, the controller 506 may encode one or more bits of the conventional UID, such as the most significant bit to provide an example, that are unused, reserved for future use, or are typically ignored by the other NFC capable device. The controller module 506 may append the conventional SAK to the modified UID to form the response 556. In another alternate, the controller module 506 may provide the response 556 including the modified SAK and the modified UID.

Additionally, one or more locations within the memory module 516 may be mapped to store the overvoltage indicator 564. Typically, these one or more locations represent portions of the memory module 516 for storing bits or bytes that are typically unused or reserved for future use. For example, the memory module 506 may be mapped to include location 0 through location 511 corresponding to byte 0 through byte 511 with byte 7 corresponding to location 7 being reserved for future use. In this example, the controller module 506 may map the overvoltage indicator 564 into location 7 corresponding to byte 7. The controller module 506 may store the overvoltage indicator 564 within the one or more locations of the memory module 516 and/or retrieve the overvoltage indicator 564 from the one or more locations of the memory module 516. The storing and/or retrieving of the overvoltage indicator 564 allows the controller module 506 to modify other responses to other commands to include the overvoltage indicator 564 in other modes of operation.

Exemplary Power Harvesting Modules

Figure 6:
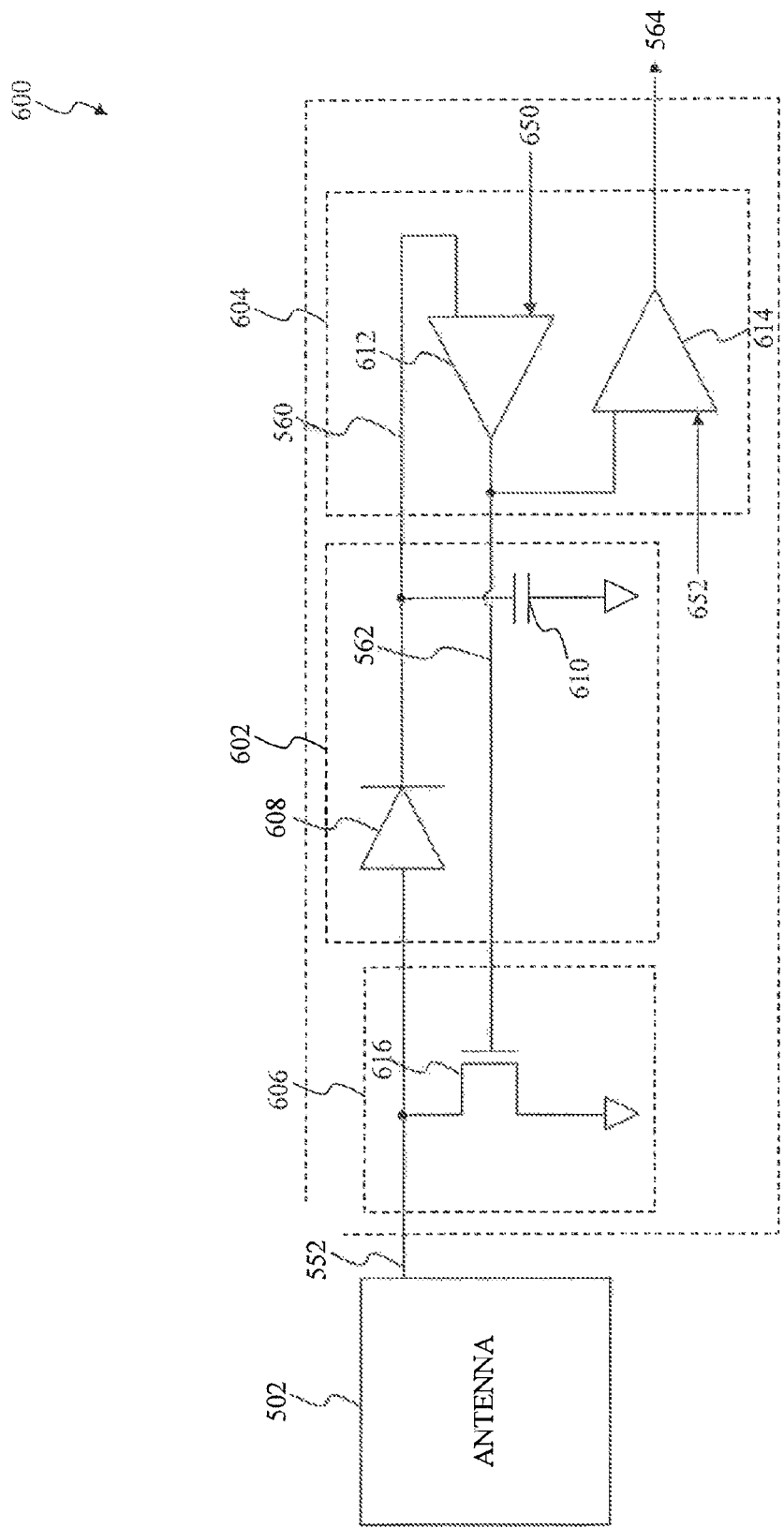
FIG. 6 illustrates a block diagram of a power harvesting module that may be used in the NFC device according to an exemplary embodiment of the invention.

FIG. 6 illustrates a block diagram of a power harvesting module that may be used in the NFC device according to an exemplary embodiment of the invention. A power harvesting module 600 may harvest power from the recovered communications signal 552. The power harvesting module 600 includes a rectifier module 602, a regulator controller 604, and a regulator module 606. The power harvesting module 600 may represent an exemplary embodiment of the power harvesting module 508.

The antenna module 502 provides the recovered communications signal 552.

The rectifier module 602 substantially converts the recovered communication signal 552 from AC to DC to provide the rectified power 560. The rectifier module 602 includes a rectifying diode 608 and a capacitor 610. The rectifying diode 608 half-wave rectifies the recovered communication signal 552 from AC to DC to provide the rectified power 560. The capacitor 610 substantially converts the rectified power 560 from AC to DC. The rectifier module 602 may represent an exemplary embodiment of the rectifier module 510.

The regulator controller 604 compares the rectified power 560 with a reference power 650 to provide the regulation control signal 562 and compares the regulation control signal 562 with an overvoltage threshold 652 to provide the overvoltage indicator 564. The regulator controller 604 includes an error amplifier 612 and a comparator 614. The error amplifier 612 compares the rectified power 560 with the reference power 650 to provide a difference between the rectified power 560 and the reference power 650 as the regulation control signal 562.

The comparator 614 compares the regulation control signal 562 with the overvoltage threshold 652 to provide an overvoltage indicator 564. The overvoltage threshold 652 may set to a value that is greater than or equal to the reference power 650. Typically, the comparator provides the overvoltage indicator 564 at a first logical level when the regulation control signal is less than the overvoltage threshold 652. The overvoltage indicator 564 indicates that the overvoltage condition is not present when at the first logical level. The comparator provides the overvoltage indicator 564 at a second logical level when the regulation control signal is greater than or equal to the overvoltage threshold 652. The overvoltage indicator 564 indicates that the overvoltage condition is present when at the second logical level. The regulator controller 604 may represent an exemplary embodiment of the regulator controller 512.

The regulator module 606 adjusts the power level of the recovered communication signal 552 in response to the regulation control signal 562. The regulator module 606 includes a shunt transistor 616. The shunt transistor 616 represents controllable impedance that shunts at least some of the recovered communications signal 552 to a ground potential when the regulation control signal 562 is greater than or equal to its threshold voltage. The amount of the recovered communications signal 552 that is shunted to ground is related to a magnitude of the regulation control signal 562. The shunt transistor 616 will shunt more of the recovered communications signal 552 for a larger regulation control signal 562.

Figure 7:
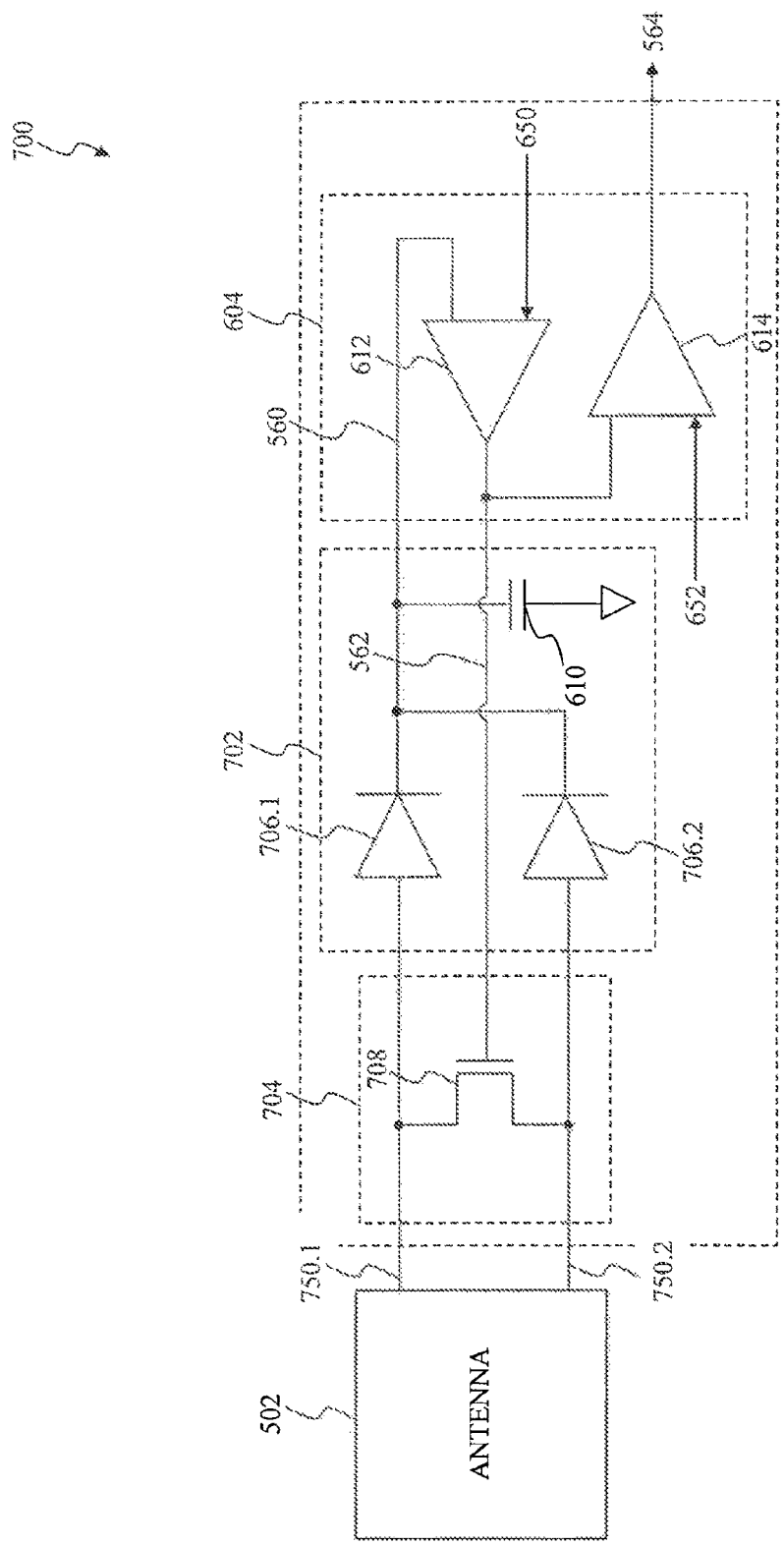
FIG. 7 illustrates a second block diagram of the power harvesting module that may be used in the NFC device according to an exemplary embodiment of the invention.

FIG. 7 illustrates a second block diagram of the power harvesting module that may be used in the NFC device according to an exemplary embodiment of the invention. A power harvesting module 700 may harvest power from a differential recovered communications signal 752.1, 752.2. The power harvesting module 700 includes the regulator controller 604, a rectifier module 702, and the regulator module 704. The power harvesting module 700 may represent an exemplary embodiment of the power harvesting module 508. The power harvesting module 700 shares many substantially similar features as the power harvesting module 600; therefore, only differences between the power harvesting module 600 and the power harvesting module 600 are to be described in further detail.

The antenna module 502 provides the differential recovered communications signal 752.1, 752.2. The differential recovered communications signal 752.1, 752.2 may represent an exemplary embodiment of the recovered communications signal 552.

The rectifier module 702 substantially converts the differential recovered communications signal 752.1, 752.2 from AC to DC to provide the rectified power 560. The rectifier module 602 includes rectifying diodes 706.1 and 706.2 and the capacitor 610. The rectifying diodes 706.1 and 706.2 half-wave rectify the differential recovered communications signal 752.1, 752.2 from AC to DC to provide the rectified power 560. The capacitor 610 substantially converts the rectified power 560 from AC to DC. The rectifier module 702 may represent an exemplary embodiment of the rectifier module 510.

The regulator module 704 adjusts the power level of the differential recovered communications signal 752.1, 752.2 in response to the regulation control signal 562. The regulator module 606 includes a shunt transistor 616. The shunt transistor 616 represents controllable impedance that shunts at least some of the recovered communications signal 752.1 with at least some of the differential recovered communications signal 752.2 when the regulation control signal 562 is greater than or equal to its threshold voltage. The amount of the differential recovered communications signal 752.1, 752.2 that is shunted together is related to a magnitude of the regulation control signal 562. The shunt transistor 616 will shunt more of the differential recovered communications signal 752.1, 752.2 together for a larger regulation control signal 562.

CONCLUSION

Although the Detailed Description section describes the polling mode of operation used in a NFC communications environment, those skilled in the relevant art(s) will recognize that other commands in other modes of operation may be similarly modified without departing from the spirit and scope of the present invention. The present invention may also be used to indicate the overvoltage condition using other responses that includes one or more bits that are typically ignored or able to be modified.

It is to be appreciated that the Detailed Description section, and not the Abstract section, is intended to be used to interpret the claims. The Abstract section may set forth one or more, but not all exemplary embodiments, of the invention, and thus, are not intended to limit the invention and the appended claims in any way.

The invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the invention. Thus the invention should not be limited by any of the above-described exemplary embodiments, but should be defined only in accordance with the following claims and their equivalents.

What is claimed is:

1. A method for optimizing power consumption in a near field communication (NFC) environment, comprising:
providing, by a first NFC device, a first communications signal including a read command at a first power to a second NFC device to recover a unique identifier (UID) of the second NFC device;
receiving, by the first NFC device, a second communications signal including a response to the read command from the second NFC device;
determining, by the first NFC device, whether a complete UID of the second NFC device has been received;
determining, by the first NFC device in response to the complete UID of the second NFC device not being received, whether the response indicates an overvoltage condition is present in the second NFC device; and
repeating the providing, the receiving, the determining whether the complete UID has been received, and the determining whether the response indicates the overvoltage condition until the complete UID of the second NFC device has been received,
wherein for each repetition, the response includes one or more other bits of the UID for each repetition.

2. The method of claim 1, further comprising:
adjusting, by the first NFC device, the first power to a second power in response to determining the over voltage condition is present.

3. The method of claim 2, further comprising:
providing, by the first NFC device, the first communications signal at the second power to recover the UID of the second NFC device;
activating, by the first NFC device, a timing mechanism; and
providing, by the first NFC device, the first communications signal at the first power to recover the UID of the second NFC device upon expiration of the timing mechanism.

4. The method of claim 1, wherein the response includes a plurality of bits, at least a first bit from among the plurality of bits indicating whether the complete UID of the second NFC device has been provided and at least a second bit from among the plurality of bits indicating whether the overvoltage condition is present in the second NFC device.

5. The method of claim 1, further comprising:
providing, by the first NFC device, a third communications signal including a polling command to the second NFC device; and
receiving, by the first NFC device, a fourth communications signal including a response to the polling command from the second NFC device.

6. The method of claim 1, further comprising:
storing, by the first NFC device, an overvoltage indicator in a memory module to indicate the presence of the overvoltage condition.

7. The method of claim 6, wherein the storing further comprises:
storing the overvoltage indicator in one or more bits of the memory module that are unused or reserved for future use by a communication standard.

8. A method for optimizing power consumption in a near field communication (NFC) environment, comprising:
receiving, by a first NFC device, a first communications signal including a read command at a first power from a second NFC device to recover a unique identifier (UID) of the first NFC device;
monitoring, by the first NFC device, the first power to determine whether an overvoltage condition is present;
providing, by the first NFC device, a second communications signal including a response to the read command to the second NFC device, the response including one or more bits of the UID and an indication of whether the overvoltage condition is present; and
repeating the monitoring and the providing until a complete UID has been provided to the second NFC device,
wherein for each repetition, the response includes one or more other bits of the UID.

9. The method of claim 8, wherein the monitoring further comprises:
comparing, by the first NFC device, the first power with an overvoltage threshold, the overvoltage condition being present when the first power is greater than the overvoltage threshold.

10. The method of claim 8, wherein the providing further comprises:
encoding, by the first NFC device, a first group of one or more bits of the response to indicate that the overvoltage condition is present.

11. The method of claim 10, wherein the providing further comprises: encoding, by the first NFC device, a second group of the one or more bits of the response to indicate the complete UID has been provided to the second NFC device.

12. The method of claim 8, wherein the monitoring comprises:
converting, by the first NFC device, the first communications signal from alternating current (AC) to direct current (DC) to provide a rectified power; and
comparing the rectified power with the an overvoltage threshold, the overvoltage condition being present when the rectified power is greater than the overvoltage threshold.

13. The method of claim 12, wherein the monitoring further comprises:
comparing the rectified power with a reference power; and
regulating the first communications signal when the rectified power is greater than the reference power.

14. The method of claim 8, further comprising:
receiving, by the first NFC device, a third communications signal including a polling command from the second NFC device; and
providing, by the first NFC device, a fourth communications signal including a response to the polling command to the second NFC device.

15. An apparatus for optimizing power consumption in a near field communication (NFC) environment, comprising:
a demodulator module configured to demodulate a first communications signal including a read command requesting one or more bits of a unique identifier (UID) of the apparatus, and
a controller module configured to:
monitor a power level of the first communications signal to determine whether an overvoltage condition is present,
provide a response to the read command in a second communications signal, the response including one or more bits of the UID and an indication of whether the overvoltage condition is present, and
continue to monitor the power level and to provide one or more subsequent responses until a complete UID has been provided, each of the one or more subsequent responses including one or more other bits of the UID and the indication of whether the overvoltage condition is present.

16. The apparatus of claim 15, wherein the response and the one or more subsequent responses comprise:
   a first group of one or more bits to indicate that the overvoltage condition is present; and
   a second group of one or more bits of the response to indicate whether the complete UID has been provided.

17. The apparatus of claim 16, further comprising:
   a rectifier module configured to convert the first communications signal from alternating current (AC) to direct current (DC) to provide a rectified power; and
   a regulator controller configured to compare the rectified power with an overvoltage threshold to determine whether the overvoltage condition is present, the overvoltage condition being present when the rectified power is greater than the overvoltage threshold.

18. The apparatus of claim 17, wherein the regulator controller is further configured to compare the rectified power with a power threshold to provide a regulation control signal, and further comprising:
   a regulator module configured to adjust a power level of the first communications signal in response to the regulation control signal.

19. The apparatus of claim 15, further comprising:
   an antenna module configured to:
      inductively receive the first communications signal via a magnetic field,
      inductively receive a third communications signal including a polling command via the magnetic field, and
      provide a fourth communications signal including a response to the polling command via the magnetic field.

20. The method of claim 11, wherein the repeating comprises: repeating the encoding the first group of the one or more bits of the response and the encoding the second group of the one or more bits of the response until the complete UID has been provided to the second NFC device.

* * * * *